United States Patent
Faith et al.

(10) Patent No.: US 9,324,071 B2
(45) Date of Patent: Apr. 26, 2016

(54) POWERING FINANCIAL TRANSACTION TOKEN WITH ONBOARD POWER SOURCE

(75) Inventors: Patrick L. Faith, Pleasanton, CA (US); Ayman A. Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1733 days.

(21) Appl. No.: 12/052,279

(22) Filed: Mar. 20, 2008

(65) Prior Publication Data

US 2009/0240625 A1 Sep. 24, 2009

(51) Int. Cl.
| | |
|---|---|
| *G06Q 20/00* | (2012.01) |
| *G06Q 20/34* | (2012.01) |
| *G06K 19/07* | (2006.01) |
| *G06K 19/077* | (2006.01) |
| *G06Q 20/32* | (2012.01) |
| *G06Q 20/36* | (2012.01) |

(Continued)

(52) U.S. Cl.
CPC ........ *G06Q 20/341* (2013.01); *G06K 19/06187* (2013.01); *G06K 19/0701* (2013.01); *G06K 19/0705* (2013.01); *G06K 19/07703* (2013.01); *G06Q 20/32* (2013.01); *G06Q 20/3278* (2013.01); *G06Q 20/367* (2013.01); *G07F 7/0806* (2013.01); *G07F 7/10* (2013.01); *G06K 19/067* (2013.01); *G06K 19/06009* (2013.01); *G06K 19/0706* (2013.01); *G06K 19/0716* (2013.01); *G06K 19/08* (2013.01); *G06Q 20/20* (2013.01); *G07F 7/0826* (2013.01)

(58) Field of Classification Search
CPC ...... G06Q 20/00–20/425; G06K 19/00–19/18; G07F 7/00–7/127
See application file for complete search history.

(56) References Cited

U.S. PATENT DOCUMENTS

| | | |
|---|---|---|
| 4,706,162 A | 11/1987 | Hernandez et al. |
| 5,776,278 A | 7/1998 | Tuttle et al. |

(Continued)

FOREIGN PATENT DOCUMENTS

| | | |
|---|---|---|
| EP | 0 840 251 A2 | 5/1998 |
| KR | 10-2007-0109450 A | 11/2007 |

(Continued)

OTHER PUBLICATIONS

International Search Report, for Application No. PCT/US2009/037712 dated Oct. 12, 2009, 11 pages.

(Continued)

*Primary Examiner* — Calvin L Hewitt, II
*Assistant Examiner* — Mohammad A Nilforoush
(74) *Attorney, Agent, or Firm* — Kilpatrick Townsend & Stockton LLP

(57) ABSTRACT

There is provided a card or token for use in financial transactions. The financial transaction token or card has an onboard energy storage device that enables onboard electronics to operate when the card is not in the proximity of a merchant Point-Of-Service (POS) terminal. In one implementation, the onboard energy storage device includes a capacitor such as a thin-film capacitor that stores sufficient energy to power onboard electronics without the need for an onboard battery. The card may be incorporated within various conventional apparatus such as a see-through and/or protective substrate, an item of clothing, an item of jewelry, a cell phone, a Personal Digital Assistant (PDA), a credit card, an identification card, a money holder, a wallet, a personal organizer, a keychain payment tag, and like personality.

20 Claims, 14 Drawing Sheets

(51) Int. Cl.
*G07F 7/08* (2006.01)
*G07F 7/10* (2006.01)
*G06K 19/06* (2006.01)
*G06K 19/067* (2006.01)
*G06K 19/08* (2006.01)
*G06Q 20/20* (2012.01)

(56) References Cited

U.S. PATENT DOCUMENTS

| | | | |
|---|---|---|---|
| 5,892,661 | A | 4/1999 | Stafford et al. |
| 6,108,191 | A * | 8/2000 | Bruchhaus et al. ........ 361/306.3 |
| 6,264,108 | B1 | 7/2001 | Baentsch |
| 7,437,578 | B2 * | 10/2008 | Menzl ........................... 713/300 |
| 8,429,085 | B2 | 4/2013 | Faith et al. |
| 2004/0049460 | A1 * | 3/2004 | Doron et al. .................... 705/41 |
| 2004/0129787 | A1 | 7/2004 | Saito et al. |
| 2004/0177045 | A1 * | 9/2004 | Brown ........................... 705/65 |
| 2005/0001711 | A1 | 1/2005 | Doughty et al. |
| 2005/0013090 | A1 | 1/2005 | Ahrens et al. |
| 2005/0139685 | A1 | 6/2005 | Kozlay |
| 2006/0186209 | A1 | 8/2006 | Narendra et al. |
| 2006/0261174 | A1 | 11/2006 | Zellner et al. |
| 2007/0285246 | A1 * | 12/2007 | Koyama ...................... 340/572.1 |
| 2008/0195875 | A1 * | 8/2008 | Hobson ........................ 713/320 |
| 2008/0319912 | A1 | 12/2008 | Faith et al. |

FOREIGN PATENT DOCUMENTS

| | | |
|---|---|---|
| WO | 92/15140 A1 | 9/1992 |
| WO | 2007/131052 A2 | 11/2007 |

OTHER PUBLICATIONS

Extended European Search Report mailed Apr. 26, 2013 for EP Patent Application No. 09722664.1.
Examination Report issued on Mar. 21, 2013 for Australian Patent Application No. 2009225553.
U.S. Appl. No. 11/767,144, "Notice of Allowance", mailed Dec. 20, 2012.
U.S. Appl. No. 11/767,144, "Office Action", mailed May 2, 2012.
U.S. Appl. No. 11/767,144, filed Jun. 22, 2007, titled: Financial Transaction Token With Onboard Power Source.
U.S. Appl. No. 13/847,912, filed Mar. 20, 2013, titled: Financial Transaction Token With Onboard Power Source.
Examination Report dated Dec. 2, 2015 for Australian Patent Application No. 2014202706, 3 pages.

* cited by examiner

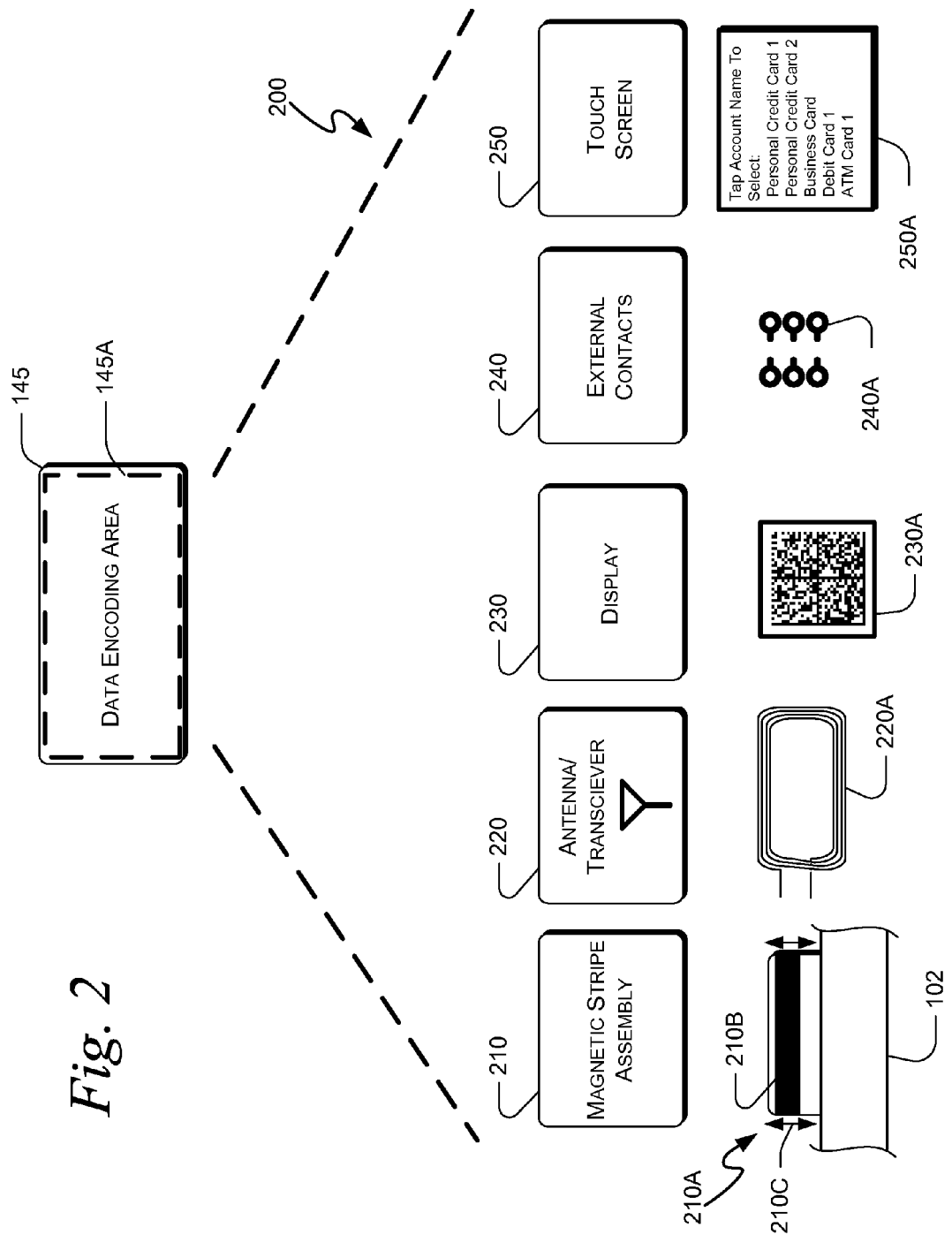

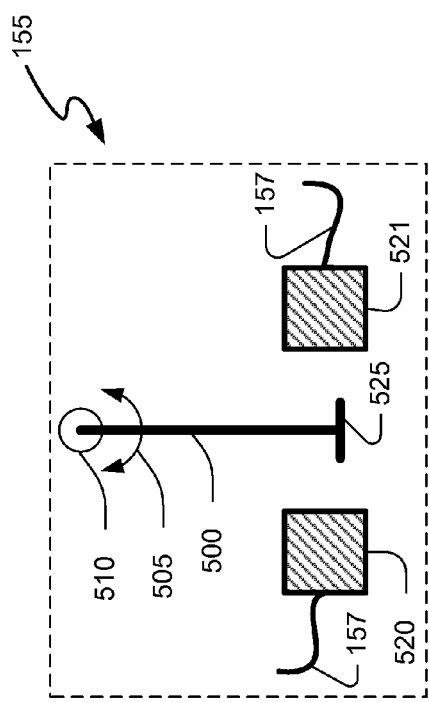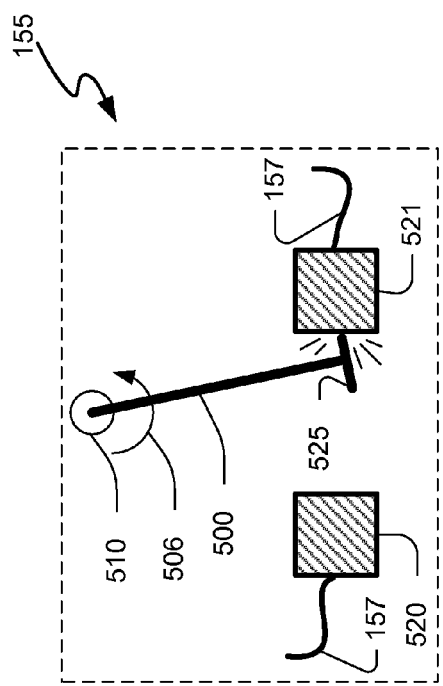

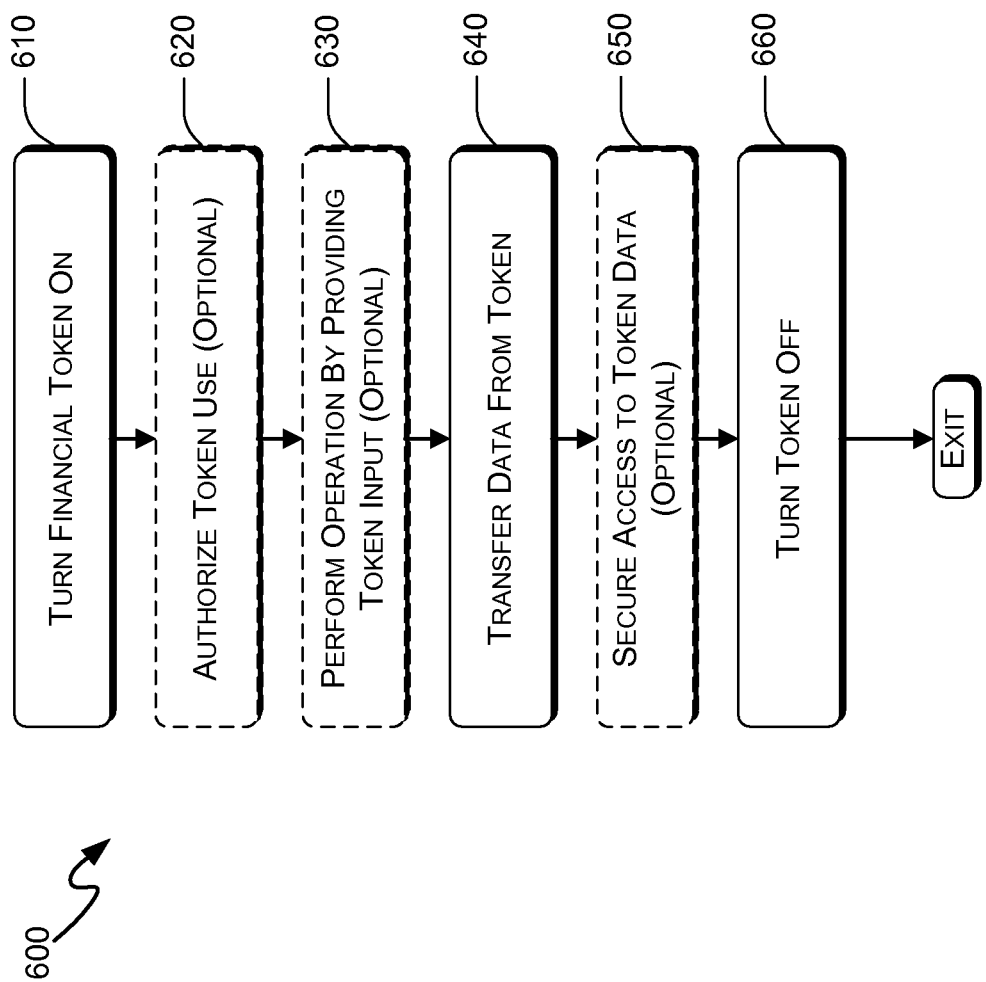

POWERING FINANCIAL TRANSACTION TOKEN WITH ONBOARD POWER SOURCE

BACKGROUND

Increasingly, consumers have come to rely on debit, credit, and stored value cards as a preferred vehicle to provide payment for transactions. Credit cards provide ready access to funds, offer financial protection superior to cash or checks, support loyalty programs, and allow consumers to take advantage of purchasing opportunities when funds may not be otherwise available. As debit and stored value cards have become increasingly popular, the need for consumers to carry cash or checkbooks is still further reduced.

Within the past few years, card associations and issuers have been providing transaction cards that are enhanced with features beyond the typical embossed account number, expiration date, cardholder name, and signature area. "Smart cards," for example, have now come into popular use, and allow for enhanced security of both debit and credit cards by use of onboard integrated circuits to provide memory and optional microprocessor functionality. Smart cards and other enhanced or memory cards or tokens have found uses from replacements for simple embossed credit/debit cards, toll booth payment, ATM card replacements, and even Subscriber Identity Module (SIM) cards in cellular handsets.

Even though smart cards and electronics-enhanced cards have provided improvements over traditional credit cards, they suffer from a number of deficiencies. For example, electronics circuitry on enhanced financial transaction cards must receive externally-provided power to operate. To obtain power from a merchant's financial or Point-Of-Service (POS) terminal, contact-type smart cards use a physical connector interface; two of such interfaces are defined ISO standards 7810 and 7816. However, many types of cards not in physical contact with a POS terminal or other power source cannot operate, and therefore these cards are necessarily inactive at all other times. Alternatively, some enhanced financial transaction cards obtain power from a terminal-generated RF electromagnetic field by way of an inductor that is part of the card's circuitry. For example, ISO 14443 defines a popular contactless financial transaction card protocol. However, current contactless cards must be in close proximity to the properly modulated electromagnetic field in order to operate (10 cm in the case of ISO 14443-compliant cards). Due to the intentionally limited power and range of such short range fields, RF-powered cards cannot operate outside of the immediate area of a merchant's POS terminal, and may not have sufficient power in some cases to provide sophisticated electronic computations or support more power consuming circuitry such as displays. Further, embedded chips of some contactless smart cards often employ cryptographic security algorithms that can be "cracked" or decoded if the time and electrical current required for certain encryption or decryption operations is measured. Several demonstrations of this mode of account compromise have been documented, and thus, the possibility of surreptitious measurement of such parameters without knowledge of the cardholder (although they not represent a security risk to the payment system) presents a significant security risk at the individual card level.

What is needed then is a financial transaction card or token that provides an onboard power source. What is further needed is a financial transaction card or token that has an onboard power source that does not utilize the hazardous chemicals associated with typical power sources such as replaceable or rechargeable batteries. What is also needed is a financial transaction card or token that has a power source that is rechargeable and has a form factor that may be used with common credit card form factors. What is further needed is a financial transaction token with electronic circuitry that can operate in an environment significantly removed from a POS terminal. What is also needed is a financial transaction token that utilizes an onboard power source to provide cryptographic security and protect the token when not in use. What is still further needed is a financial transaction token that may reprogram itself using an onboard power source to encode a variety of types of account information, thereby allowing for payment flexibility of the financial transaction token. What is also needed is a financial transaction token that allows the holder to view information stored in the token without being in proximity to a POS terminal. What is further needed is a financial transaction token that provides for a backup power source to preserve function or memory status when a primary onboard power source has been discharged. What is also needed is a financial transaction token that automatically senses the presence of an external power source, and switches between the internal power source and external power source as the external power becomes available or unavailable.

SUMMARY

There is provided an apparatus for a token to complete financial transactions. The financial transaction token or card has an onboard energy storage device that enables onboard electronics to operate when the token or card is not in the proximity of a merchant terminal (e.g.; a POS terminal). In one implementation, the onboard energy storage device includes a capacitor such as a thin-film capacitor that stores sufficient energy to power the token's onboard electronics without the need for an onboard battery. The financial transaction token may be incorporated within an apparatus such as a plastic substrate, an item of clothing, an item of jewelry, a cell phone, a PDA, a credit card, an identification card, a money holder, a wallet, a personal organizer, purse, a briefcase, or a keychain payment tag.

In one implementation, the financial transaction token includes a capacitor that energizes the token's electronics circuitry. The user interface optionally has an exposed region for encoding data including an account to pay for a transaction. The encoding renders data in several alternate or complementary formats, such as light- or laser-scannable bar coding on a display, electromagnetic signals that are transmitted to a merchant receiver, external contact pads for a contact-based pickup, and a magnetic stripe assembly. In one implementation, the token is reprogrammable by the holder by inputting information to a user interface, and a processor in the token accepts the information and runs software in a processor located within the token. This reprogrammable feature enables the holder of the token to secure the token by erasing a display or magnetic stripe or locking the token from unauthorized use. The token, when access is granted, may perform calculations such as adding a tip from a predetermined tip percentage, or selecting payment to occur from a variety of different financial accounts. In one implementation, a magnetic stripe assembly in proximity to the token is reprogrammable, so that the processor may select a particular account from user input, and provide instructions to reprogram the magnetic stripe. The reprogrammed stripe may then be swiped through a conventional merchant magnetic stripe reader to initiate payment for a transaction. In another implementation, the token also includes a memory that may optionally be maintained by the onboard energy source.

In another implementation, a financial transaction card is provided that has a substantially rigid substrate not unlike conventional credit cards and an onboard energy storage device such as a thin-film capacitor. The card includes, in one implementation, a conventional or reprogrammable magnetic stripe assembly that is disposed proximal the substrate. As mentioned previously, the reprogrammable substrate may be configured by a processor that is commanded through cardholder inputs. In one implementation, the cardholder provides input through an array of contact pads or blister buttons, and optionally may have access to an on/off button that may turn on the card to accept input, or turn the card off into a power-saving mode. Alternately, the user input section may include a biometric input device that scans fingerprints or other biometric data to authenticate the user of the card, or may have a pressure-sensitive area for inputting a predetermined access glyph such as by a card user dragging a fingertip over a pad to reproduce a symbol that the card user has previously identified.

In another implementation, the financial transaction token can detect the presence of an electromagnetic energy source (non-limiting examples include visible or invisible light, RF energy, ionizing radiation, communication signals from a POS terminal, or an electromagnetic field) in proximity to the token's electronics, and can utilize the electromagnetic field to capture energy to charge the token's internal power source, operate the token's internal circuitry, or a combination thereof. If the external electromagnetic energy source becomes insufficient to power the token's internal electronics, the token may optionally switch to the internal energy storage device to supplement or replace the energy derived from the external electromagnetic field.

Various features and advantages of the invention can be more fully appreciated with reference to the detailed description and accompanying drawings that follow.

DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 2 illustrates possible alternate implementations of the data encoding area seen in FIG. 1;

FIGS. 5A-5B show illustrations of a pendulum and piezoelectric crystal implementation of the charging interface seen in FIG. 1;

FIG. 6 illustrates an exemplary process for the use of various contemplated implementations a financial transaction token;

DETAILED DESCRIPTION

Figure 1:
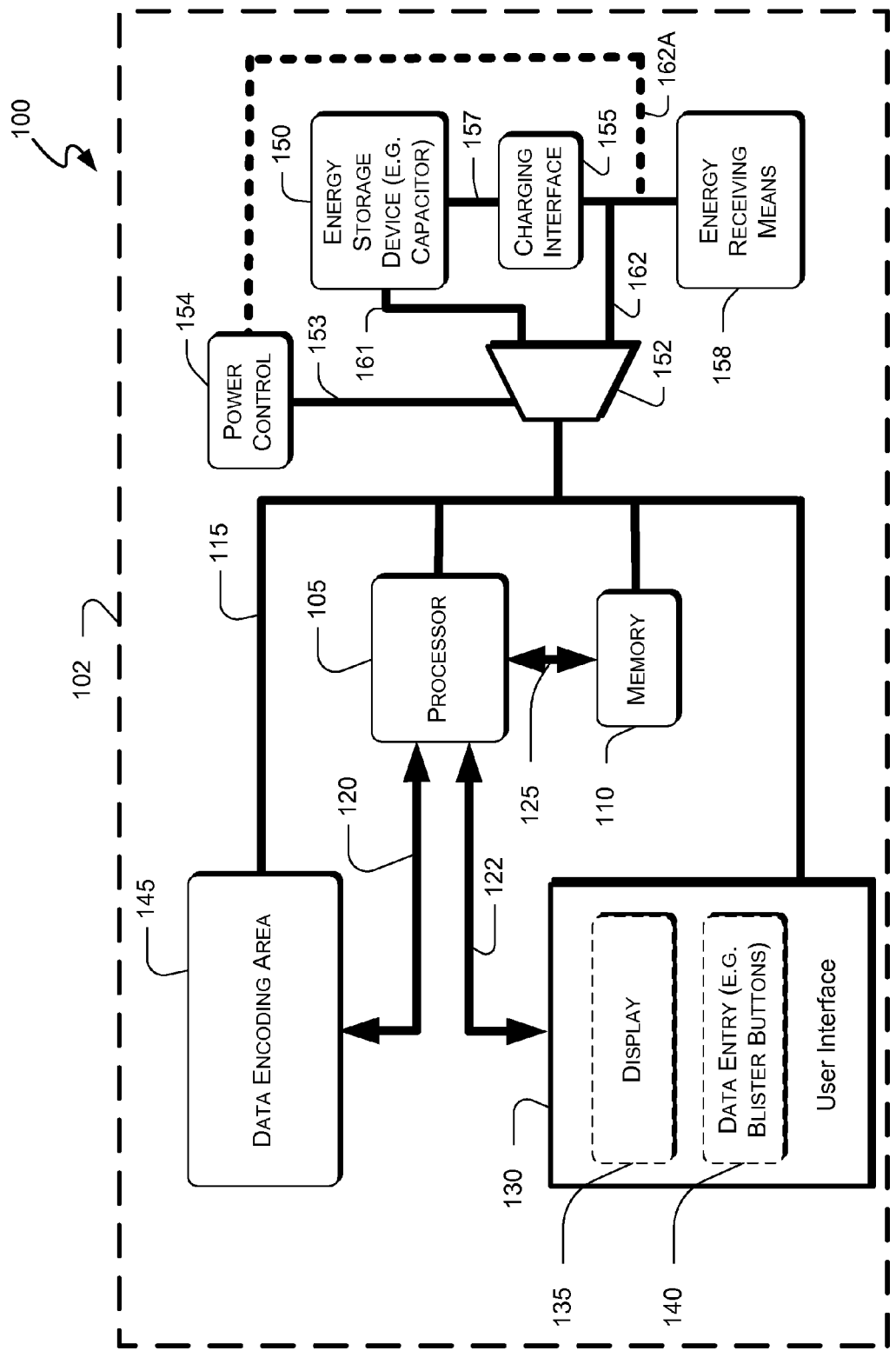
FIG. 1 depicts a block diagram of an exemplary implementation of a financial transaction token including a data encoding area, a charging interface, and an energy receiving means.
Figure 13:
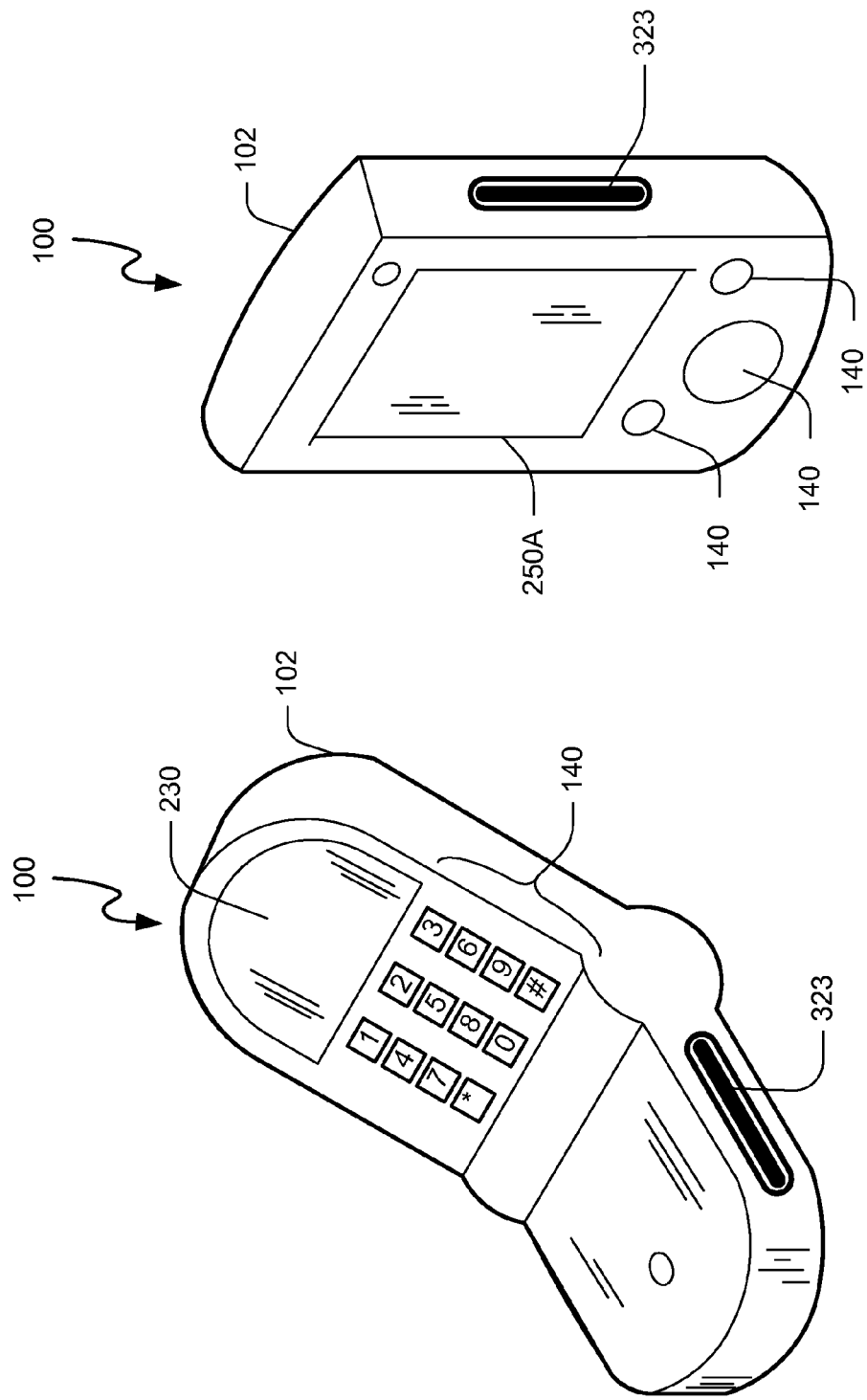
FIGS. 13A-13B illustrate two additional exemplary embodiments for assemblies comprising financial transaction tokens.

A block diagram for an exemplary implementation of a financial transaction token 100 is seen FIG. 1. The financial transaction token 100 comprises an assembly 102 that houses, supports, and/or integrates the components shown in FIG. 1. Those of skill in the relevant arts understand that the assembly 102 may be integrated within a consumer product, and non-limiting examples include cell phones or PDAs such as depicted in FIGS. 13A and 13B, or, in the alternative, the assembly 102 may comprise a financial token such as those depicted in FIGS. 3A-3D and 4A-4D. The financial transaction token includes a processor 105, which those of skill in the relevant arts will appreciate may comprise a microprocessor chip, a microcontroller chip, an ASIC, a digital signal processor (DSP), a Field Programmable Gate Array, a wired logic chip, or a smart card chip. The processor 105 is coupled to a power circuit 115. The power circuit 115 provides power to the token's electronic components 105, 110, 130, and 145, and may further include signals indicating charging or connection status. The processor 105 is further coupled to signal busses 120, 122, and 125, which those of skill in the relevant arts will recognize may be comprised of a plurality of individual dedicated signal circuits, commonly shared signal busses, bidirectional signal circuits, unidirectional signal circuits, or combinations thereof. In one implementation, signal busses 120, 122, and 125 comprise a single commonly shared address/data bus with associated control signals. The processor is coupled to a memory 110 through signal bus 125. The memory 110 may comprise volatile memory such as CMOS or DRAM memory, nonvolatile memory such as ROM, PROM, EEPROM, flash memory (whether NAND- or NOR-type), or combinations thereof, and such memory may be included in total or in part upon the same integrated circuit substrate as the processor 105. The memory 110, if of volatile type, may have its data values preserved by power provided by the connected power circuit 115. Data stored in memory 110 may include code or program instructions which, when executed by processor 105, performs at least part of command sequence requested by a user through the user interface 130.

An onboard energy storage device 150 such as a capacitor is coupled to a stored energy circuit 161 which energizes the power circuit 115 through switch 152. In one implementation, the switch 152 comprises a hard-wired circuit coupling the energy storage device 150 to the power circuit 115. Those of skill in the relevant arts will also recognize that energy storage devices such as batteries, inductors, capacitors, or combinations thereof may be utilized to implement the energy storage device 150 in FIG. 1. In one implementation, energy storage device 150 comprises a thin film capacitor, and may utilize a single dielectric or a multilayer configuration alternating conducting layers and dielectric layers. A number of dielectrics such as polyester; polypropylene; polycarbonate; polystyrene; polyimide; polyfunctional acrylics; amorphous hydrogenated carbon; polytetrafluoroethylene; polyxylylene, nitrides of silicon and aluminum, PTFE, PET, and combinations thereof may be utilized in such thin film capacitor implementations. One feature of such dielectrics that may be valuable in a card-sized form factor would be at least slight flexibility of the dielectric material, allowing for minor bending forces to distort the shape of the capacitor without causing loss of connectivity or damage to the capacitor when the capacitor is embedded in an assembly such as a financial card.

A substantially planar thin film capacitor implementation is beneficial for implementation in the instant financial transaction token circuit, as the substantially planar form factor may be applied on a surface of a financial transaction card or token, or may be wholly or partially buried within a cavity defined within the substrate of a financial transaction card or token 100. Implementation of the energy storage device 150 as a single or multilayer capacitor also provides the benefit of avoiding the use of the leakable and potentially dangerous electrolytes associated with batteries, while also allowing quick rechargeability. With no toxic electrolytes needed in the capacitor implementation, the financial transaction token 100 may be more safely carried in a wallet or purse, and may also be disposed of with fewer environment toxicity concerns. In another implementation, energy storage device 150 may be implemented with any number of conventional rechargeable and non-rechargeable batteries such as alkaline batteries, lithium ion batteries, nickel-cadmium batteries, and nickel metal hydride batteries.

The energy storage device 150, via a coupling 157, is in electrical communication with a charging interface 155. Those of skill in the relevant arts will readily recognize that the charging interface 155 may be implemented with electrical contacts to an external charger, or may comprise additional electrical components to switch or regulate charging current provided to the energy storage device 150.

In another implementation, charging interface 155 further includes one or more piezoelectric crystals electrically connected, via coupling 157, to the energy storage device 150, and a movable pendulum mass that strikes the piezoelectric crystals as the token 100 is moved. Turning to FIG. 5A, a piezoelectric charger implementation of the charging interface 155 is shown. A movable pendulum mass 500 rotates 505, preferably in a substantially planar motion, about a pinned end 510. The pendulum mass 500 also has an impact end 525, that is disposed between and may strike either of two piezoelectric crystals 520, 521. As the crystals 520, 521 are electrically coupled 157 to the energy storage device 150, impacts of the pendulum mass 500 cause pulses of current to be delivered to the energy storage device 150 thus charging the storage device 150. FIG. 5B provides an illustration of the pendulum 500 moving 506 to strike crystal 521, and likewise, the pendulum mass 500 may move the opposite direction to strike the other crystal 520.

Returning to FIG. 1, an energy receiving means 158 is also provided, and is electrically coupled via a charging circuit 162 to the charging interface 155 and the switch 152. The energy receiving means 158, in one embodiment, is sensitive to electromagnetic energy such as visible or invisible light, RF energy, ionizing radiation, communication signals from a POS terminal, or an electromagnetic field. In one implementation, the energy receiving means comprises an antenna or an inductor for receiving power via electromagnetic radiation. The energy receiving means 158 may also include one or more photovoltaic cells, which produce electricity upon exposure to light. When the energy receiving means 158 is exposed to an appropriate electromagnetic energy source of sufficient magnitude, the energy storage device 150 may be charged by the current provided by the energy receiving means 158 that was coupled through the charging interface 158. As the energy receiving means 158 is also coupled to an input of the switch 162, the token 100 may be operated from power obtained by the energy receiving means 158. As an example, but not by way of limitation, the feedback circuit 162A provides a coupling for the power control 154 to sense the voltage on the circuit 162, so that when the energy receiving means 158 is delivering sufficient energy to the circuit 162, the power control 154 may operate the switch 154 to select the externally provided power from the energy receiving means 158 in lieu of or in addition to the power provided by the internal energy storage device 150.

Figure 4B:
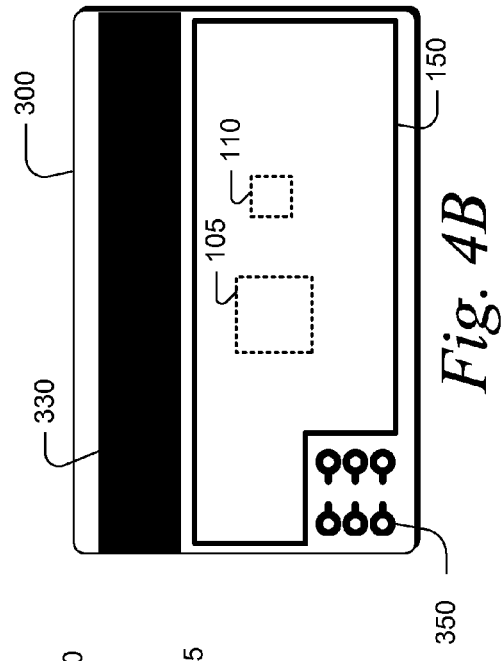
FIGS. 4A-4B show a front and rear views, respectively, of yet another exemplary implementation of a financial transaction token.
Figure 4D:
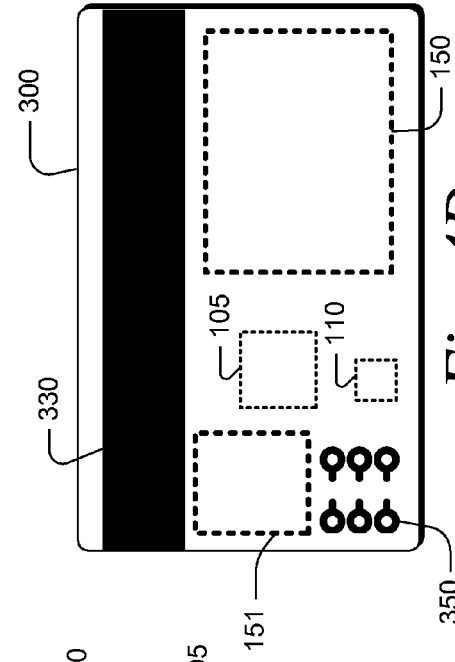
FIGS. 4C-4D show a front and rear views, respectively, of yet another exemplary implementation of a financial transaction token.

The circuit in FIG. 1, in one implementation, comprises an optional supplemental energy storage device is provided (not shown in FIG. 1, but shown at least at reference numeral 151 in FIG. 4D). The supplemental device 151 may comprise a capacitor as described above in relation to energy storage device 150, or may comprise any number of conventional rechargeable and non-rechargeable batteries such as alkaline batteries, lithium ion batteries, nickel-cadmium batteries, and nickel metal hydride batteries. The supplemental device 151 may optionally be electrically coupled to the charging interface 155, though with it may be charged, or to which it may deliver charging current to charge the energy storage device 150. The supplemental device 151 may be optionally coupled to the power control switch 152, so that the power circuit 115 may be selectively energized by the energy storage device 150, the supplemental device 151, or a combination, based on the signal 153 provided by power control 154. In one implementation, power control 154 is provided through an electrical interface to an accessory (not shown) to the token 100, whereby the accessory commands the switching of power based on environmental concerns or by the charge state of the energy storage device 150, which may, in one implementation, be provided by a command executed by the processor 105. The power control 154 may also be implemented through conventional voltage sensing circuitry, whereby the switch 152 may energize the power circuit 115 with either the output of the energy storage device 150 or the supplemental energy storage device 151 when the charge state of the energy storage device 150 does not meet a predetermined threshold in the voltage sending circuitry. Once the charge state of the energy storage device 150 is sensed by the power control 154 to have been refreshed to a sufficient predetermined level, the switch 152 may receive a control signal 153 to energize the power circuit 115 with the energy storage device 150 rather than the supplemental energy storage device 151. In one embodiment, the power control 154 may sense when neither the energy storage device 150 or the supplemental energy storage device 151 are capable of delivering sufficient power for a predetermined period, and may provide input to the processor 105, allowing execution of commands notifying a user of a low power state and/or prompting the user to provide an external or alternate energy source.

Continuing with FIG. 1, a user interface 130 is also provided, and is coupled to the power circuit 115 and to the processor 105 via signal bus 122. In one implementation, the user interface may include one or more conventional displays 135 that may output text, graphics, or a combination. The display 135 may be implemented in such formats as a liquid crystal display, a thin film transistor display, touch screen, or organic LED display. The user interface 130 also includes an optional data entry apparatus 140. In one implementation, the data entry apparatus 140 may include an array of buttons labeled in a manner such as a QWERTY keyboard, a touch pad, a touch screen, or in a more simplistic implementation, as a telephone touch pad with alphanumeric key assignments. The interface 130 may also receive data from an outside source such as a wireless POS terminal, a financial institution, or a personal computer, and may relay the data to the integrated processor 105 through data bus 122. In one implementation, the buttons in the data entry apparatus 140 may comprise blister buttons commonly known in the art. The user interface 130 may also include an optional on/off button that activates the card for selecting desired account access, performing a calculation, or authenticating a user.

A data encoding area 145 is also provided. The data encoding area receives data and/or commands for displaying text or graphical information from bus 120, and receives power from power circuit 115. As the processor 105 may select the appropriate data based on user input to the user interface 130, a variety of data may be provided. In one implementation, the information provided to the data encoding area 145 may comprise health care information, personal identity information, biometric data, music, video data, or a combination thereof, and is considered interchangeable with the term "account data" used herein.

Turning to FIG. 2, exemplary implementations 200 of the data encoding area 145 are shown. Data encoding area 145 is shown with an optional shielding element 145A, which allows desired electromagnetic, optical, or radiative signals to penetrate while protecting the data encoding area 145 from physical abuse or damage. The token 100 may optionally have areas outside of the data encoding area 145 shielded from physical abuse or otherwise acceptable forms of electromagnetic radiation. Some of the acceptable signals that are allowed to penetrate the shielding 145A and may include, but are not limited to, signals accompanying a magnetic field, RFID signals, IrDA signals, visible light, invisible light, modulated laser, and/or modulated RF communication signals. By way of example and not by way of limitation, selective shielding element 145A may comprise a clear plastic shield, conformal coatings, an opaque plastic shield, or a clear thin film, depending on the implementation of data encoding area 145.

Non-limiting examples of the data encoding area are shown at reference numeral 200, and include a magnetic stripe assembly 210, an antenna and/or transceiver 220, a display 230, and electrical contacts 240, and a touch screen 250. The magnetic stripe assembly 210 may comprise, in one implementation 210A, a reprogrammable magnetic stripe 210B that accepts data and/or commands from the processor 105 and formats and renders that data into a form on a magnetic stripe that is readable by conventional merchant magnetic stripe-reading POS terminals. In this manner, the processor 105 may program a particular account for use in a transaction as a function of user input selecting the account. Alternatively, the processor 105 may erase the magnetic stripe of the assembly 210, rendering the card useless in the event of its loss or theft. In one implementation shown 210A, the magnetic stripe assembly 210B at least partially slidably moves 210C into and out of the assembly 102 of the token 100 (partial view shown), allowing the token 100 to conduct a financial transaction at a point of sale terminal that includes a magnetic stripe reader.

Continuing with FIG. 2, another implementation of the data encoding area 145 is shown as an antenna and/or transceiver 220. The antenna 220 may include commonly used loop inductors such as the one shown 220A or in those shown in related ISO standards for RF-readable smart cards. With such an interface, account data may be translated, modulated and transmitted in a manner acceptable by an RF contactless merchant Point-Of-Service (POS) terminal, a 802.11 WiFi or WiMax network, or by a cellular or RF communications network.

The data encoding area 145 may also be represented with a display 230. Account data may be rendered in the form of an optically-readable area, such as a one dimensional or two dimensional bar code 230A. In this manner, merchant POS terminals may optically scan the display area 230 with conventional laser scanners, and obtain account information without the need for expensive contactless RF POS terminals. As the display is electronically reconfigurable with information provided by the processor 105, the token 100 may represent any number of accounts for transaction payment based on the user's preference and input to the user interface 130. Also, as a security feature, the display may be blanked or filled with a decorative or entertaining graphic when the user has not provided an optional security access code, pad stroke, or pin number to the user interface 130.

External contacts 240 are yet another alternative implementation of the data encoding area 145 shown in FIG. 2. With the financial transaction token 100 possessing physical contacts such as an array of conductive pads or shapes 240A, the financial transaction token may be placed in physical contact with a merchant POS terminals, and the external contacts 240 may establish connectivity to the merchant's financial processing system. The processor 105 may relay account-related information to the merchant POS terminal through the contact interface, thereby allowing the token 100 to be utilized with the large number of preexisting merchant POS terminals that accept smart cards.

Alternatively, the data encoding area 145 may comprise a touch screen 250, wherein text and/or graphics may be displayed, and user input may be accepted by touching selected areas of the screen. For example, but not by way of limitation, in an implementation shown at reference numeral 250A, a user is prompted to tap on one of a plurality of account descriptors, thereby selecting an account to complete a transaction. Those of skill in the relevant arts also appreciate that tapping the screen may be combined with using pointing devices such as a joystick, direction buttons, or selection wheels. In one embodiment, a user may provide authentication information by touching the display 250 in specified areas to indicate sequences of pin numbers, selected graphical elements, or drag strokes that match a predetermined access criterion stored within the storage 110. As with the other implementations 210, 220, 230, and 240 of the data encoding area 145, a combination of techniques may be utilized within the data encoding area 145 to provide flexibility of use and ease of merchant access to account information.

Turning to FIGS. 3A-3D and 4A-4D, various and exemplary implementations of a financial transaction card 300 are shown. The substrate of the card 300 is substantially rigid and thin as are conventional credit or debit cards, and possesses substantially similar dimensions as existing credit, debit, stored value, or smart cards. In one implementation, the thickness of card 300 exceeds that of conventional credit, debit, or stored value cards in order to accommodate circuitry, electronics, displays, and/or interface elements. The substrate of the card 300 contains embedded processor 105 and memory 110, and a circuit topology as described in regards to the block diagram for token 100 of FIG. 1.

Figure 3A:
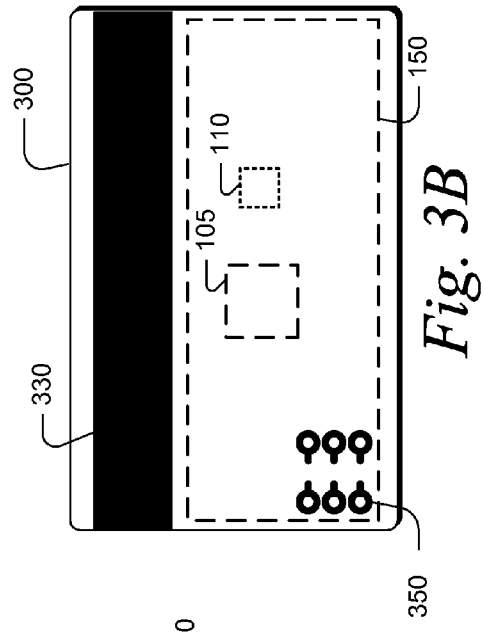
FIGS. 3A-3B show front and rear views, respectively, of an exemplary implementation of a financial transaction token.

In FIG. 3A, a front side of card 300 is shown with an array of buttons 310 and an on/off button 305 comprising elements of the user interface 130. The front side of the card 300 also includes a display 135 for outputting alphanumeric text or graphics, such as an account number and expiration date. An array of physical contacts 350 is shown, which may be utilized in conjunction with data entry 140, the data encoding area 145, and/or the charging interface 155. Those of skill in the relevant arts will readily appreciate that the contacts 350 shown in FIGS. 3A-3D may include more or less electrical contact elements than those shown depending on the particular use, and may be located together or separately on any side or portion of the card 300 as required by merchant POS terminals, interoperability requirements, or circuit topology.

Figure 3B:
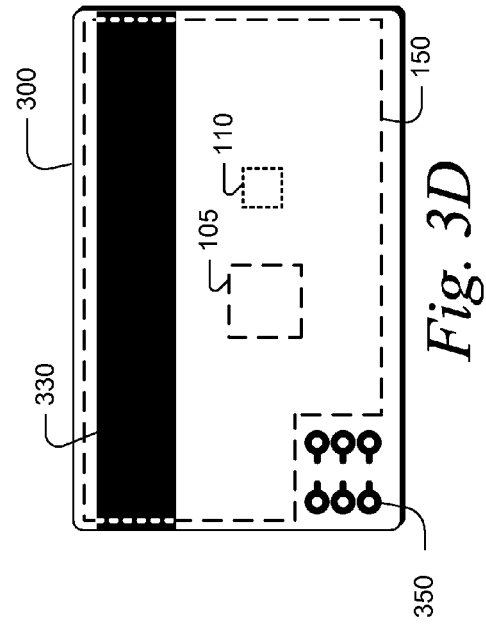
Figure 3C:
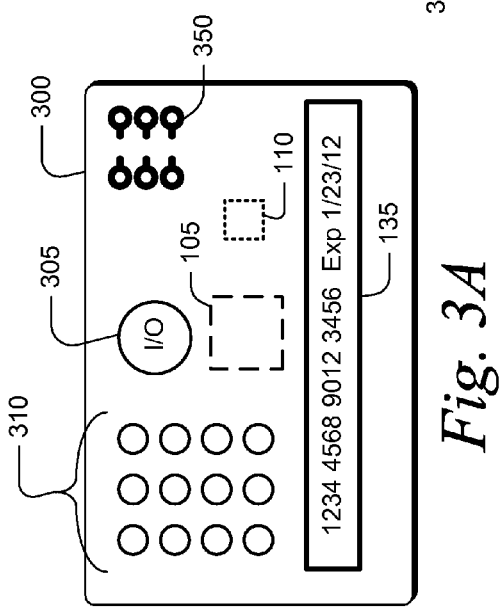
FIGS. 3C-3D show front and rear views, respectively, of another exemplary implementation of a financial transaction token.

FIG. 3C shows a front view of an alternate implementation of card 300, with a similar array of buttons 310 and an on/off button 305 comprising elements of the user interface 130. An array of physical contacts 350 is shown, which may be utilized in conjunction with data entry 140, the data encoding area 145, and/or the charging interface 155. A display 135 is shown encoding a barcode that may be scanned by an optical scanner available at merchant locations, and may relay data from processor 105 (embedded, not shown) to provide account-related or other data. A display 230 as part of an implementation of the data encoding area 145 is also shown, with a 2-d barcode illustrated that is readable by optical means to provide account-related or other data that was relayed by the processor 105. Those of skill in the relevant arts will recognize that such combination of features may be interchanged with those described in other aspects of the financial transaction token.

Figure 4A:
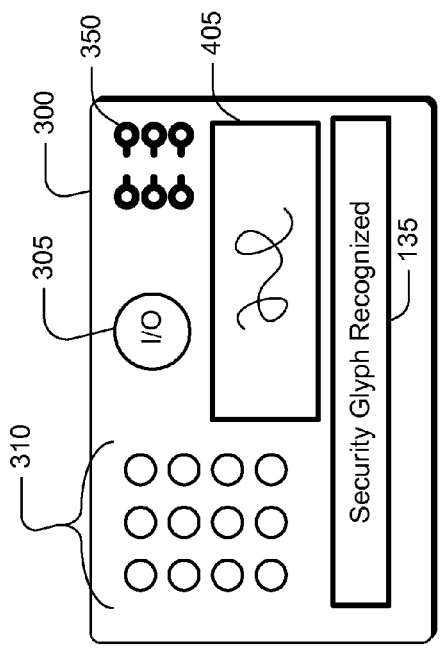

FIG. 4A shows a front view of another implementation of card 300, with a similar array of buttons 310 and an on/off button 305 comprising elements of the user interface 130. An array of physical contacts 350 is shown, which may be utilized in conjunction with data entry 140, the data encoding area 145, and/or the charging interface 155. The user interface 130 of the card shown in FIG. 4A also includes a touch pad or touch screen 405. The touch pad or screen 405 accepts inputs from physical contact by either a stylus, pen, or fingertip, and in one implementation, allows a user to provide input such as entering a facsimile of a pre-stored glyph to authorize use of the card.

In one implementation, the user turns on the card by depressing the on/off button 305, then produces a stroke on the pad/screen 405 by dragging a fingertip or stylus across the pad or screen area 405 to reproduce a symbol or glyph substantially similar to a symbol pre-programmed into the processor 105 and memory 110 (embedded, not shown). Once the symbol or glyph is entered by the user on the pad/screen 405, the processor compares its features with a pre-stored graphical implementation and if the symbol's features are within a predetermined range, the card 300 is enabled for use, otherwise an invalid entry message is output to display 135 and use is further inhibited until the successful glyph or symbol is entered.

Figure 4C:
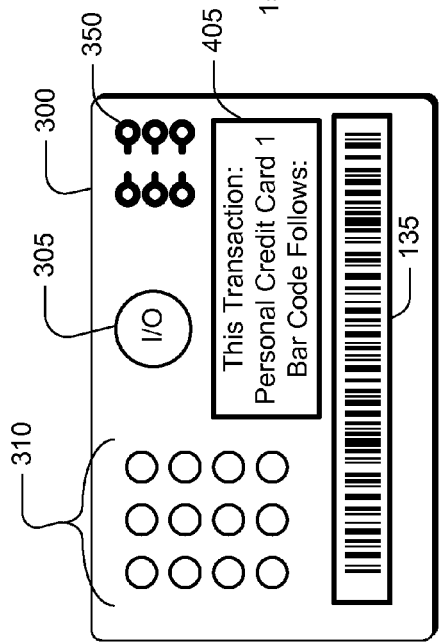

FIG. 4C shows a front view of yet another implementation of card 300, with a similar array of buttons 310 and an on/off button 305 comprising elements of the user interface 130. An array of physical contacts 350 is shown, which may be utilized in conjunction with data entry 140, the data encoding area 145, and/or the charging interface 155. The user interface 130 of the card shown in FIG. 4C also includes a touch pad or touch screen 405. The touch pad or screen 405 accepts inputs from physical contact by either a stylus, pen, or fingertip, and in one implementation, allows a user to provide input such selecting an account to be used to provide payment for a transaction, and an indicia of an account, such as a bar code, may subsequently be output on a display 135 to consummate a transaction.

FIGS. 3B, 3D, 4B, and 4D show rear views of respective implementations of a financial transaction card 300. The card 300 has a magnetic stripe 330 which like conventional magnetic stripe fields, is readable in preexisting merchant POS terminals or ATMs. The magnetic stripe 330, as part of the data encoding area 145 and magnetic stripe assembly 210 may optionally be programmable by data and commands sent from the embedded processor 105 and memory 110.

Also shown on the card 300 is an optional array of physical contacts 350, which, as described above may be utilized in conjunction with data entry apparatus 140, the data encoding area 145, and/or the charging interface 155. Those of skill in the relevant arts will also recognize that other of the aforementioned data encoding elements 145 or user interface elements 130 may reside on the back surface of the card 300, and this orientation may be preferential to preserve account security or allow additional features on a limited card area.

Figure 3D:
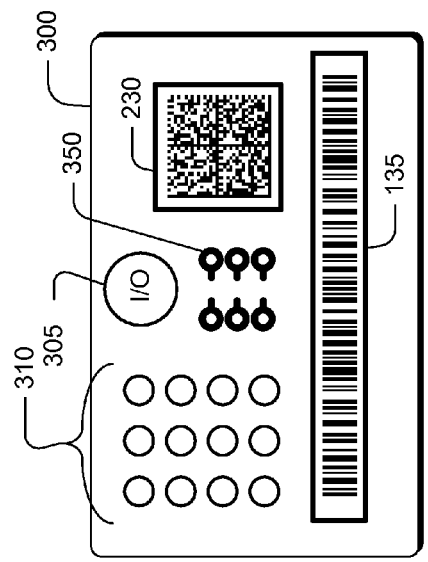

An energy storage device 150 is shown embedded in the card 300 in FIGS. 3B, 3D, and 4D, and may comprise a thin film capacitor. Those of skill in the relevant arts will recognize that such a capacitor may be applied to the surface of the card 300 as shown in FIG. 4B at reference numeral 150 rather than being located within a substrate cavity in the card 300, and may have an optional protective film, conformal coating, or encapsulant added to protect the capacitor. Additional implementations of the energy storage device 150 will be discussed in more detail below in regards to FIGS. 7-12. Those of skill in the relevant arts will also recognize that an energy storage device 150 may comprise any number of shapes, not necessarily rectilinear, and may occupy significantly all or part of the cross sectional area defined by the outer perimeter of the card 300. In the illustration shown in FIG. 3B, for example, the energy storage device 150 spans covers an area approximately two thirds of the cross-sectional area of the card 300 but could be configured to cover more or less area depending on the amount of energy storage desired and the particular layout of the card's circuitry. In FIG. 3D, the buried energy storage device 150 resides under the magnetic stripe 330 and does not occupy space in proximity to the physical contacts 350. In another embodiment FIG. 4D. of card 300, a supplemental energy storage device 151 is also included, and optionally may be embedded in the card 300.

FIG. 6 illustrates an exemplary process 600 for the use of various implementations of a financial transaction token such as financial transaction token 100 seen in FIG. 1. In step 610 the financial transaction token 100 or card 300 is turned on so that the processor 105 may assume an active state and operate by retrieving and executing program instructions stored in the memory 110. The power-on condition may be triggered by one or more of the following conditions: (a) inserting the token 100 or card 300 into a merchant POS terminal and making contact between electrical contacts in the token 100 or card 300 and the merchant POS terminal; (b) inserting the token 100 or card 300 into a user device such as a cell phone, PDA, charger, or accessory; (c) attaching an electrical connector such as a USB or Firewire connector to the token 100 or card 300; (d) depressing an on/off button 305 and/or holding the on/off button down for a predetermined period of time; (e) depressing a general purpose button 310; (f) touching a touch screen or touch pad 405; or (g) bringing a token 100 or card 300 equipped with an antenna/transceiver 220 within range of an RF merchant POS terminal. Once the token 100 or card 300 has been turned on, a display 135 or 230 may optionally display an indicia that the card is on and ready for use and/or authentication.

In step 620, the user is optionally authenticated, so that lost or stolen cards may not be used by an unauthorized party. Tokens 100 or cards 300 utilizing this step will not be usable to furnish data or complete financial transactions until the authentication requirement has been satisfied. The requirement can be met a number of ways: (a) the user or cardholder drags a fingertip or stylus across the pad or screen area 405 to reproduce a symbol or glyph substantially similar to a symbol pre-programmed into the processor 105 and memory 110, and once the symbol or glyph is entered by the user on the pad/screen 405, the processor compares its features with a pre-stored representation of a graphical element to determine that the entered symbol's features are within a predetermined range when compared to the pre-stored representation; (b) the user or cardholder enters a pin number or passphrase into the card's user interface 130 such as by depressing a series of keys 310 or touching labeled locations on a touch pad or touch screen 405, and the pin or passphrase matches a respective reference pin or passphrase pre-stored in the memory 110; (c) a biometric aspect of the user or cardholder is scanned and compared to a predetermined biometric value pre-stored in the memory 110; or (d) the card is used in a preauthorized context such as certain trusted merchants, the identity of which is stored in the memory 110. If authorization fails, the user or cardholder is notified by an optional output on a display 135, and authorization may be re-attempted. Optionally, if a predetermined number of unsuccessfully attempts occurs, the token 100 or card 300 is locked out from further transactions until a reset of the token 100 or card 300 occurs by an authorized party. If the optional authorization succeeds, the card is enabled for use.

In optional step 630, the user or cardholder provides input to the token 100 or card 300 to conduct an operation such as selecting an account for which to provide payment for a transaction, performing a calculation, obtaining stored data, storing new data, or modifying user data parameters such as a pin number, passphrase, or authorization glyph or symbol. If no user input is provided, the token 100 or card 300 will be configured to a default state, which may include the previous state or condition of the card when last used. If an account for a transaction or a request for information is selected, the processor 105 obtains the respective data from the memory 110 and renders the to the data encoding area 145 in a form appropriate for the particular mode of output 200. Thus, a token 100 or card 300 may be configured for a particular use, for instance for a user's personal credit account versus that user's business account, or for a particular issuer's account among many that are available to the user. For example, if a cardholder's personal Visa account was selected, the reprogrammable magnetic stripe 330 could be reprogrammed to provide information related to that personal Visa account from the values stored in memory 110.

Once the token 100 or card 300 is ready for use, data is transferred to the intended destination. This may occur by (a) the user or cardholder reading an output from a display 135; (b) a merchant obtaining data through a scan of the magnetic stripe 330; (c) a merchant optically scanning a barcode that is displayed in a data encoding area 145; (d) a merchant reading an electromagnetic signal transmitted from the data encoding area 145; (e) the merchant receiving data through electrical contacts of the merchant's POS terminal that are in physical contact with those provided on the token 100 or card 300; or (f) data is obtained through an electrical connector attached to the token 100 or card 300. Once the data is transferred, for instance, a merchant may complete a financial transaction using the data provided by the token 100 or card 300.

Optionally, after the data is transferred 640, the token 100 or card 300 is secured 650 so that only authorized parties may access the token 100 or card 300 and then turned off 660 so that the processor 105 may assume a standby state to conserve energy on the onboard energy storage device 150. This optional securing step 650 and the poweroff step 660 may be initiated through one or more of the following techniques: (a) allowing a predetermined period of time to pass without inputting any information to the user interface 130; (b) removing the token 100 or card 300 from contact a merchant POS terminal; (c) breaking contact between electrical contacts in the token 100 or card 300 and a merchant POS terminal, charging device, external power source, or conventional electrical connector (e.g.; USB (Universal Serial Bus) or Firewire™ (IEEE 1394)) or single wire protocol in the case of a smart card chip; (d) removing the token 100 or card 300 from a user device such as a cell phone, PDA, charger, or accessory; (e) depressing an on/off button 305 and/or holding the on/off button down for a predetermined period of time; (f) depressing a predetermined sequence of general purpose buttons 310; (f) touching a predetermined area of touch screen or touch pad 405; or (g) removing the token 100 or card 300 equipped with an antenna/transceiver 220 from the range of an RF merchant POS terminal. Once the appropriate condition has occurred to initiate shutdown, optionally, the token 100 or card 300 erases its reprogrammable magnetic stripe 330, refuses additional inputs except power on and/or authentication inputs, and/or encrypts data stored in the memory 110. Optionally, an indicia may be output to a display 135, indicating that the card is locked and secured.

Figure 7:
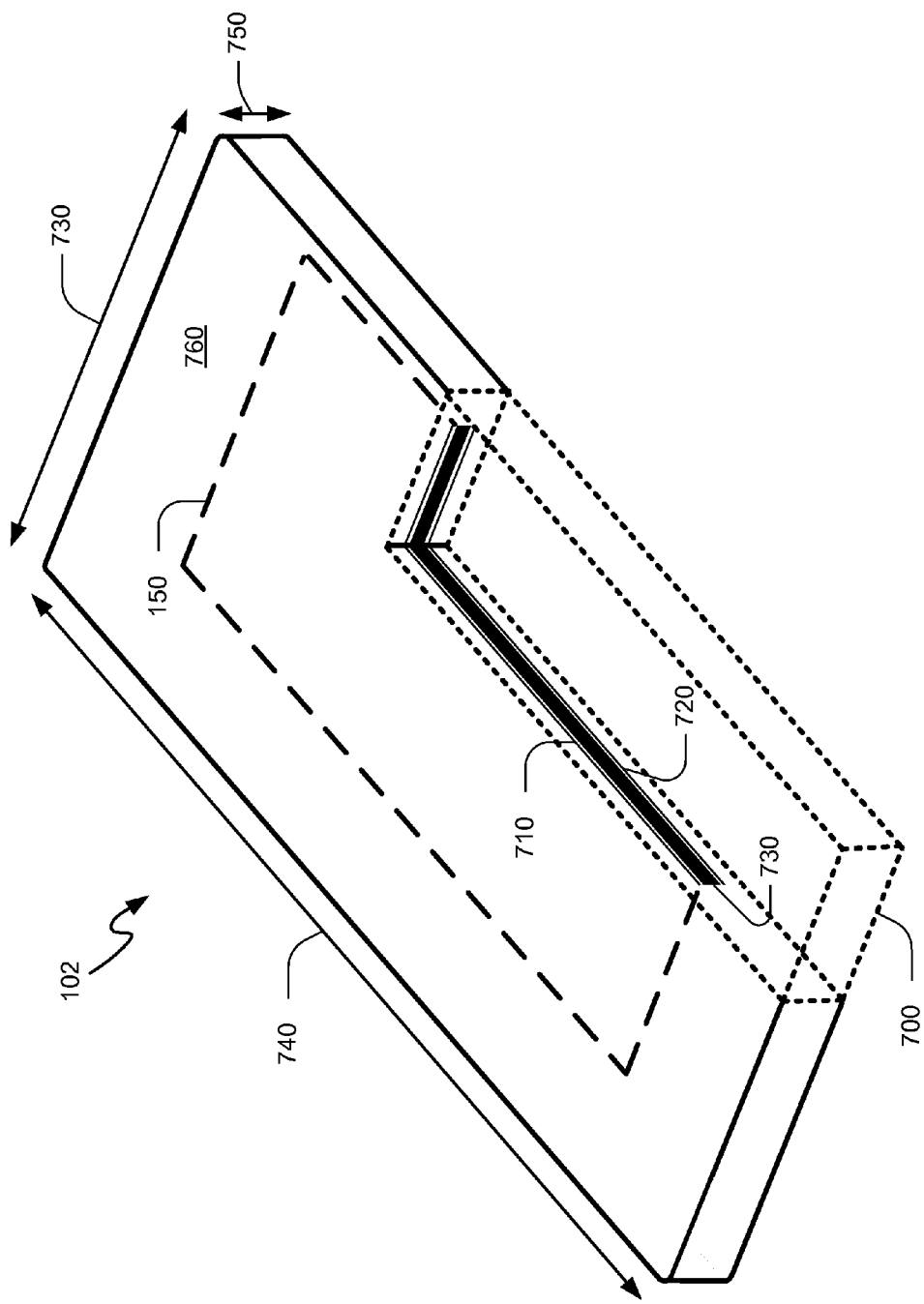
FIG. 7 illustrates in perspective view an exemplary implementation of an assembly including an embedded capacitor, a cross section removed for illustration.

Turning to FIG. 7, a perspective view an exemplary implementation of an assembly 102 including an embedded single-layer capacitor is shown. The dimensions 730, 740, and 750 of the substantially planar substrate 760 may approximate the dimensions of a conventional credit card, with possible deviations to incorporate additional features or elements. A portion 700 of the substrate 760 has been removed from the drawing to illustrate a cross section of a portion of the assembly 102. Within the substrate 760 of the assembly 102 is embedded a capacitor 150. In the illustrated implementation, the capacitor comprises a pair of substantially planar and parallel conductive electrodes 710, 720, separated by a substantially planar dielectric layer 730. The dielectric utilized may be selected based upon with the requirements of the application, and for example, but not by way of limitation, may comprise polyester; polypropylene; polycarbonate; polystyrene; polyimide; polyfunctional acrylics; amorphous hydrogenated carbon; polytetrafluoroethylene; polyxylylene, nitrides of silicon and aluminum, PTFE, PET, and combinations thereof. Although a single capacitor 150 is shown, those of skill in the relevant arts appreciate that two or more capacitors may be embedded within the assembly 102. Those of skill in the relevant arts also appreciate that the dielectric 730 may be comprised of the same or a different material than the substrate 760 of the assembly 102. Those of skill in the relevant arts understand that the capacitor 150 may comprise a thin film capacitor. The capacitor 150 is interconnected to the token 100 as described in relation to FIG. 1 above.

Figure 8:
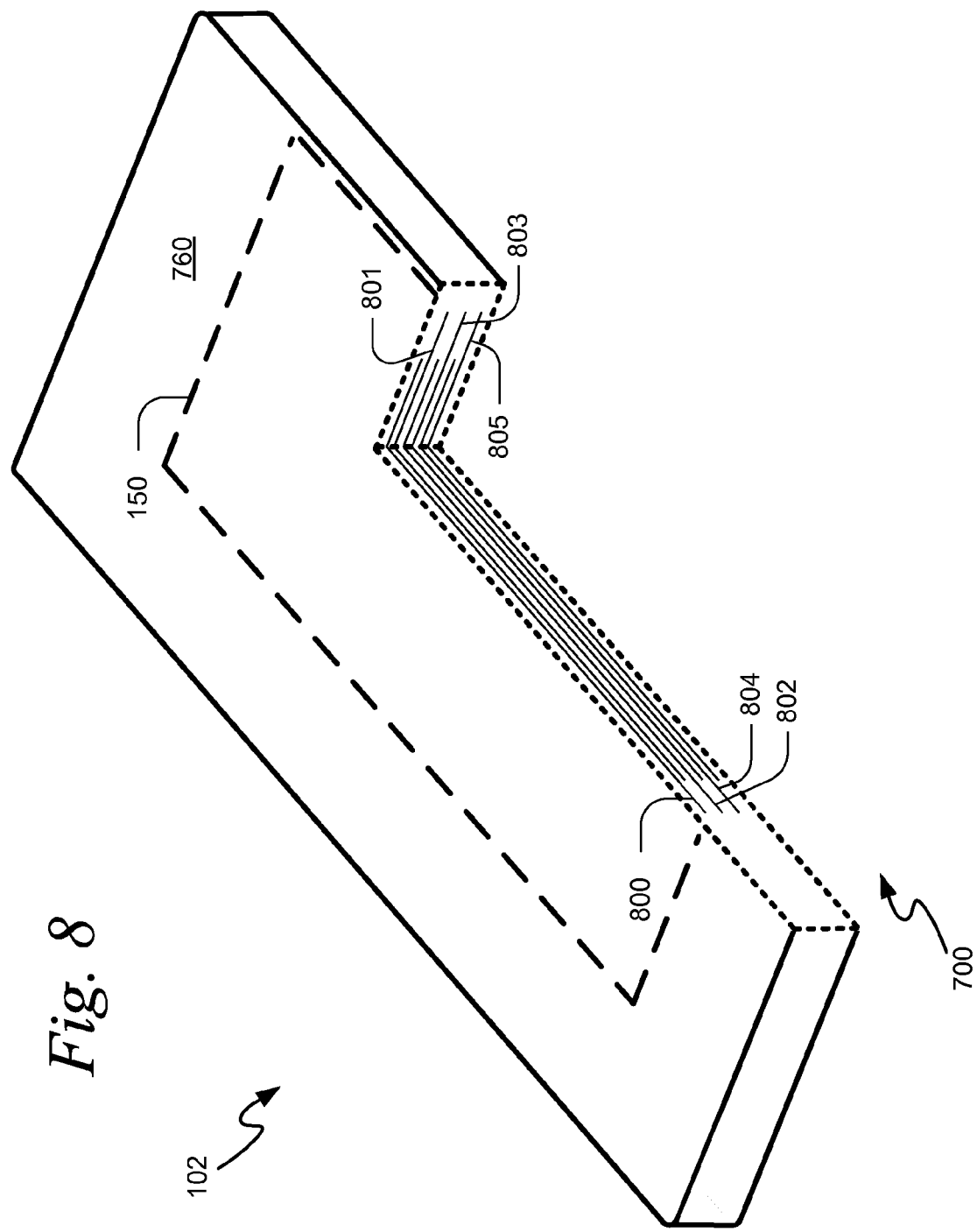
FIG. 8 illustrates in perspective view another exemplary implementation of an assembly including a multilayer embedded capacitor, a cross section removed for illustration.

Turning to FIG. 8 a perspective view an exemplary implementation of an assembly 102 including an embedded multilayer capacitor is shown. Similarly to FIG. 7, the assembly 102 comprises a substantially planar substrate 760 which may approximate the dimensions of a conventional credit card, with possible deviations to incorporate additional features or elements. A portion 700 of the substrate 760 has been removed from the drawing to illustrate a cross section of a portion of the assembly 102. Within the substrate 760 is included a multilayer capacitor 150, which is comprised of an even number of conductive electrodes, and in the illustrated implementation, six electrodes are used (800, 801, 802, 803, 804, and 805), although those of skill in the relevant arts understand that more or fewer electrodes could be used. Similarly to FIG. 7, the electrodes are conductive, and are substantially planar and parallel, and are separated by a dielectric as described in more detail in regards to FIG. 9.

Figure 9:
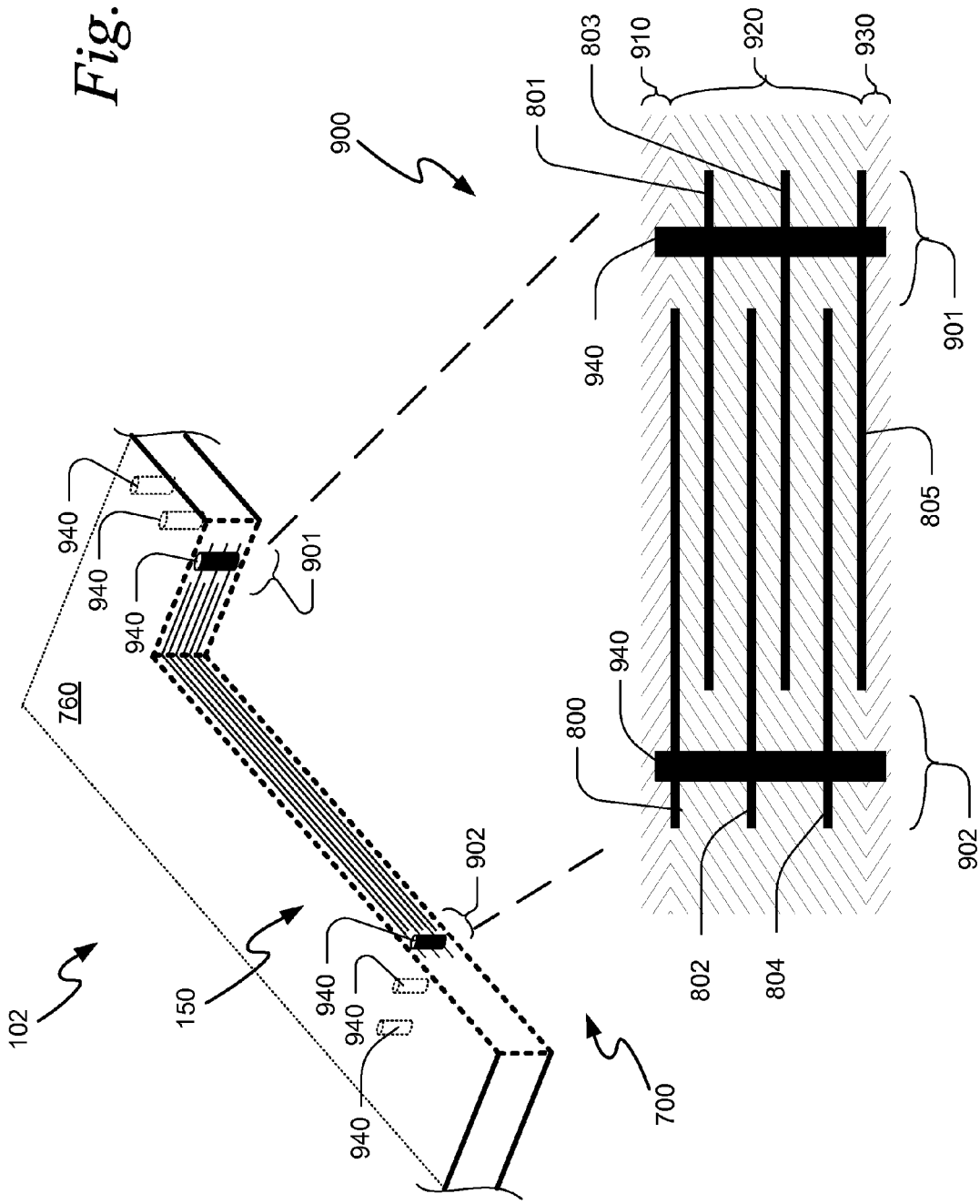
FIG. 9 illustrates in perspective view a portion of an exemplary implementation of an assembly including a multilayer embedded capacitor, a cross section removed for illustration, and showing electrical layer interconnect in expanded view.

Turning to FIG. 9, a closer prospective view is provided of a portion of the substrate 760 of the assembly 102 shown in FIG. 8. A cross-sectional view of the layer stack 900 is enlarged to show detail, and illustrates a cross section of substantially planar and parallel conductive electrodes (800, 801, 802, 803, 804, and 805) separated by a dielectric 920. Those of skill in the relevant arts appreciate that the dielectric 920 may comprise the same or different substance than the material that comprises the bulk of the substrate 760. The material comprising the bulk of the substrate 760, whether or not comprised of the same material as the dielectric 920, may cover the top 910 and cover the bottom 930 of the capacitor stack 900. The layer stack 900 may comprise a thin film multilayer capacitor, and/or may be constructed by alternative application of conductive layers and dielectric layers, assembly of successive conductive/dielectric layers, inclusion of a pre-assembled capacitor assembly, or by a combination of stacking conductive layers, dielectric layers, and conductive layers that are in whole or part oxidized. Those of skill in the relevant arts also appreciate that a multilayer capacitor can be formed from any even number of four or more alternatively interconnected conductive electrodes with intervening dielectrics, and in some embodiments may comprise thousands of layers, thereby providing for capacitances in the value ranges of picroFarads to several Farads.

Continuing with FIG. 9, an interconnection of the capacitor 150 is also provided. The conductive electrodes (800, 801, 802, 803, 804, and 805) are disposed to create non-fully overlapping zones 901, 902, in which only alternate conductive electrodes overlap. For example, in zone 901, only the odd-numbered conductive electrode planes 801, 803, and 805 overlap, and in zone 902, only the even-numbered planes 800, 802, and 804 overlap. Therefore, conductive vertical columns, or vias, 940, may provide for interconnection in the partial overlap zones 901, 902. As the vias 940 contact the conductive layers through which they penetrate, a multilayer capacitor can be formed by connecting the vias within the zone 901 to one polarity of the capacitor circuit, and the vias within zone 902 to the opposite polarity in the capacitor circuit. Those of skill in the relevant arts appreciate that the vias 940 may comprise, but not by way of limitation, any shape of conductive substance such as copper, aluminum, tin, solder, or conductive paste, and may be formed by any number of techniques including a drill-and-plate process or by an etch and fill process. The capacitor 150 is coupled to the circuitry of the token 100 as described in relation to FIG. 1 above.

Figure 10:
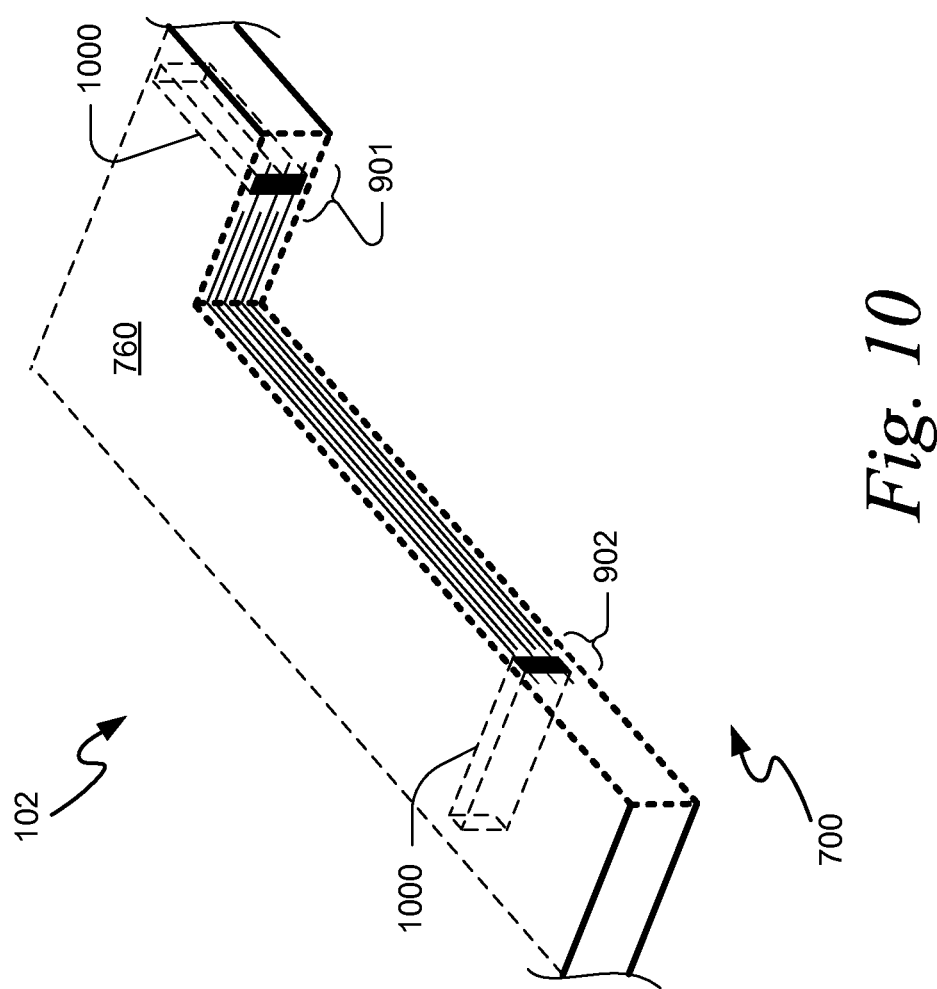
FIG. 10 illustrates in perspective view a portion of another exemplary implementation of an assembly including a multilayer embedded capacitor and electrical connection thereof, a cross section removed for illustration.

Turning to FIG. 10, an alternative embodiment of the interconnection approach shown in FIG. 9 is illustrated. Again, a portion of the substrate 760 of the assembly 102 shown with layers of the capacitor 150 appearing, but the interconnection in zones 901, 902, are in communication with approximately rectilinearly-shaped conductive channels 1000 that electrically connect alternating conductive layers as described in relation to FIG. 9. Similarly to FIG. 9, dielectric is disposed between each of the substantially parallel planar electrodes, forming a capacitor 150. Those of skill in the relevant arts appreciate that the conductive channels 1000 may comprise, but not by way of limitation, any shape of conductive substance such as copper, aluminum, tin, solder, or conductive paste, and may be formed by any number of techniques including a drill-and-plate process or by an etch and fill process.

Figure 11:
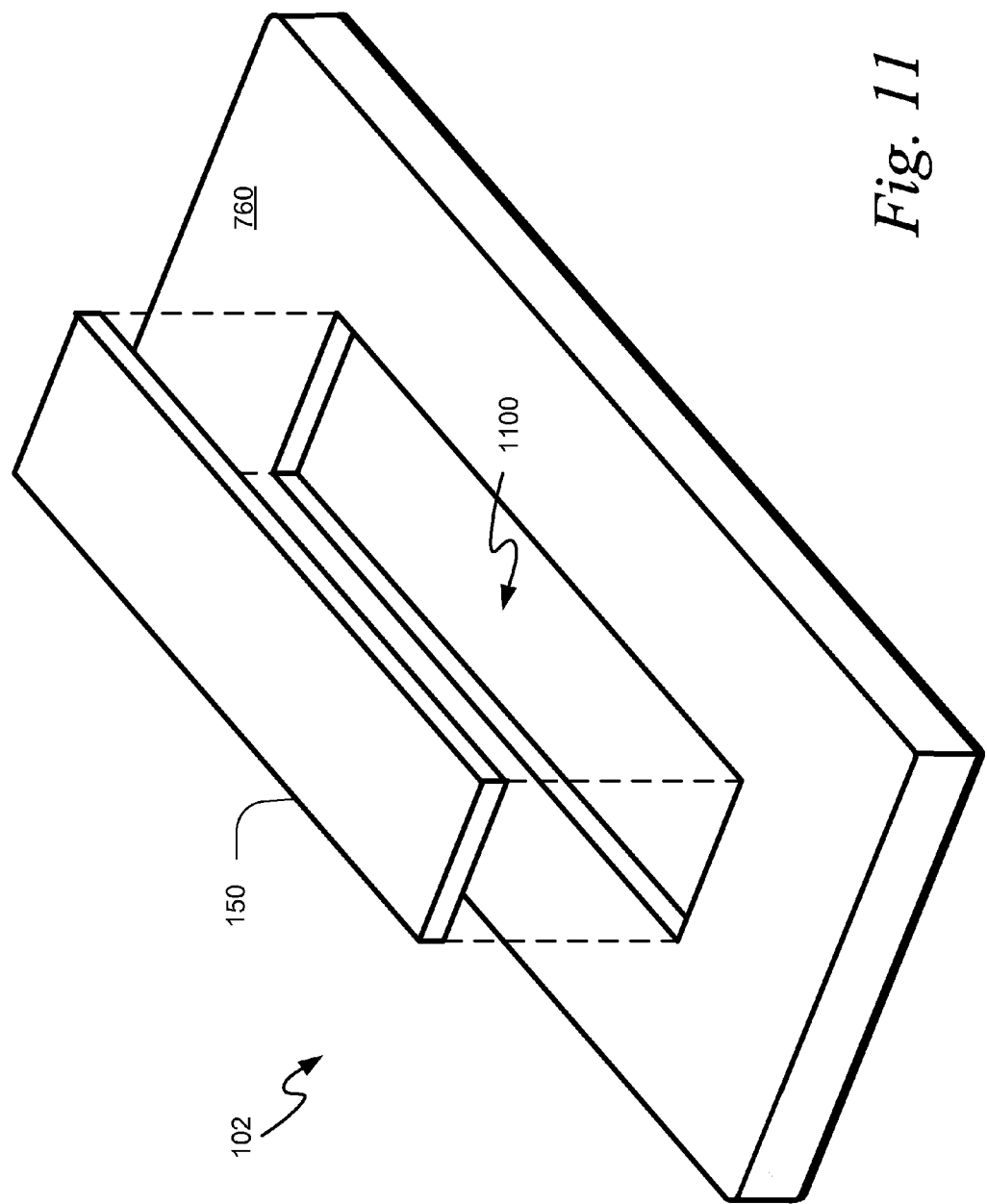
FIG. 11 illustrates in perspective view an exemplary implementation of an assembly with a cavity for inserting a capacitor.

Turning to FIG. 11, a perspective view of an implementation of the assembly 102 is shown. Similarly to FIG. 7, the assembly 102 comprises a substantially planar substrate 760 which may approximate the dimensions of a conventional credit card, with possible deviations to incorporate additional features or elements. The assembly 102 further comprises a recess or void 1100, which is sized to receive an energy storage device 150 such as a capacitor. Once the device 150 is installed in the recess 1100, a flush or substantially flush fit allows the application of a substantially planar top layer (not shown) to the top surface of the substrate 760 to cover the installed device 150. In one embodiment, the device 150 comprises a thin film capacitor, interconnected to the circuitry of FIG. 1 as described in relation thereto.

Figure 12:
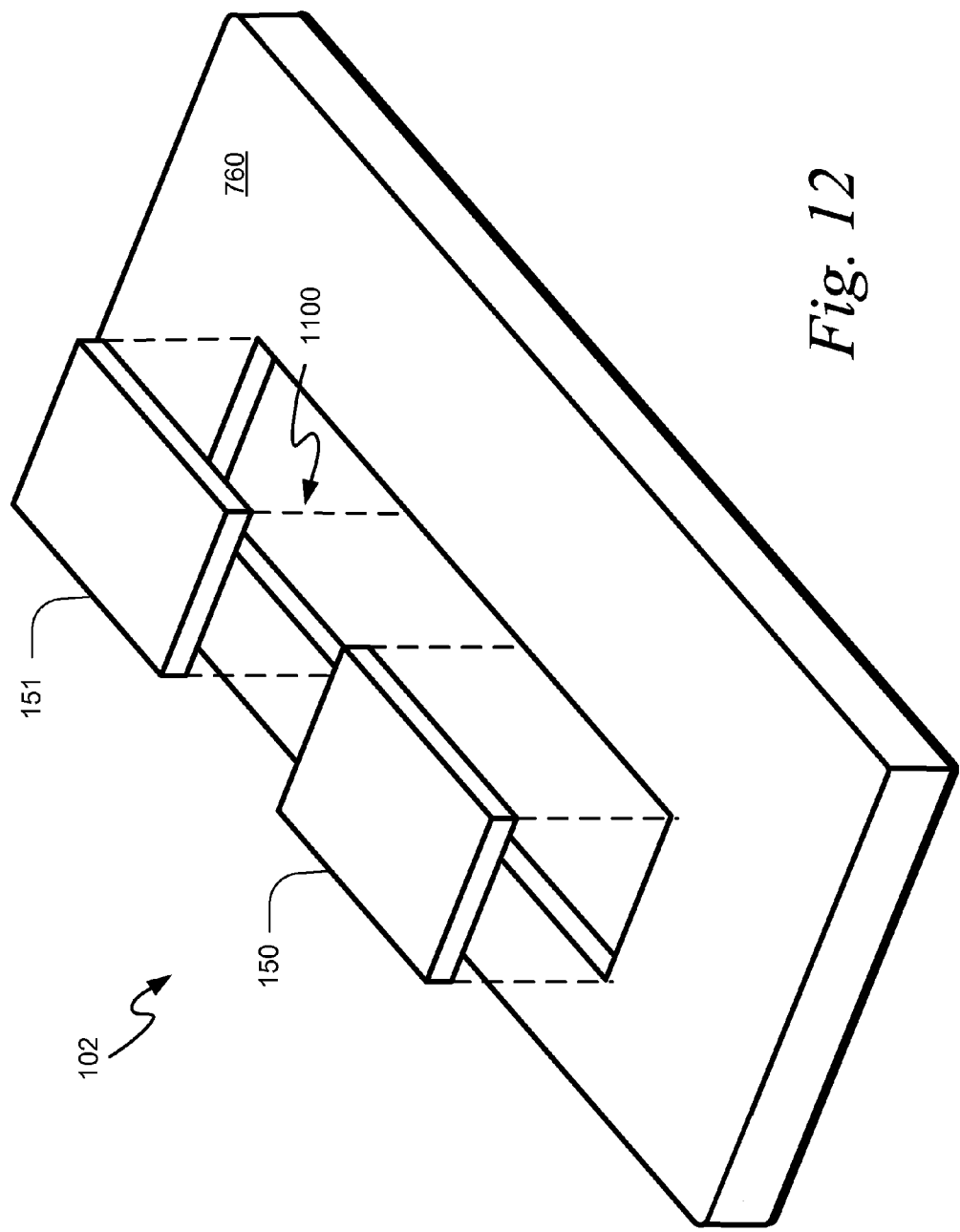
FIG. 12 illustrates in perspective view another exemplary implementation of an assembly with a cavity for inserting a capacitor and a backup energy source.

Turning to FIG. 12, an alternative perspective view of an implementation of the assembly 102 is shown. Similarly to FIG. 7, the assembly 102 comprises a substantially planar substrate 760 which may approximate the dimensions of a conventional credit card, with possible deviations to incorporate additional features or elements. The assembly 102 further comprises a recess or void 1100, which is sized to receive energy storage device 150, and supplemental energy storage device 151. Once the devices 150, 151 are installed in the recess 1100, a flush or substantially flush fit allows the application of a substantially planar top layer (not shown) to the top surface of the substrate 760 to cover the installed device 150. In one embodiment, the energy storage device 150 comprises a thin film capacitor and supplemental energy storage device 151 comprises a backup battery, both of which are interconnected to the circuitry of FIG. 1 as described in relation thereto.

Turning to FIG. 13A, an alternate implementation of the token 100 is shown as a communications device such as a cell phone. The assembly 102 includes a slot 323 for a financial card 300 (nonlimiting embodiments of which are shown in FIGS. 3A-3D, 4A-4D), or optionally, the financial card 300 is permanently or semi-permanently integrated within the hardware of the token 100. The token 100 has a display 230, and a data entry keypad 140, allowing interaction with the assembly 102 to accept user commands. As mentioned previously, the token 100 may be used to complete a financial transaction without removing card 300, or the token 100 may configure the card 300, using commands entered through the user interface 130, to select a particular transaction payment account to be transmitted to the token through the internal electrical interface (not shown). In a similar spirit, FIG. 7B illustrates another implementation of the token 100, shown as a consumer device such as a personal digital assistant (PDA). The assembly 102 includes a slot 323 for a financial token 300, or optionally, the financial token 300 is permanently or semi-permanently integrated within the hardware of the token 100. The token 100 has a touch screen display 250A for entry and output of commands and data, a data buttons and pads 140. As mentioned above, the token 100 may also be used to complete a financial transaction without removing card 300, or the token 100 may configure the card 300, using commands entered through the user interface 130, to select a particular transaction payment account to be transmitted to the token through the internal electrical interface (not shown).

Figure 14:
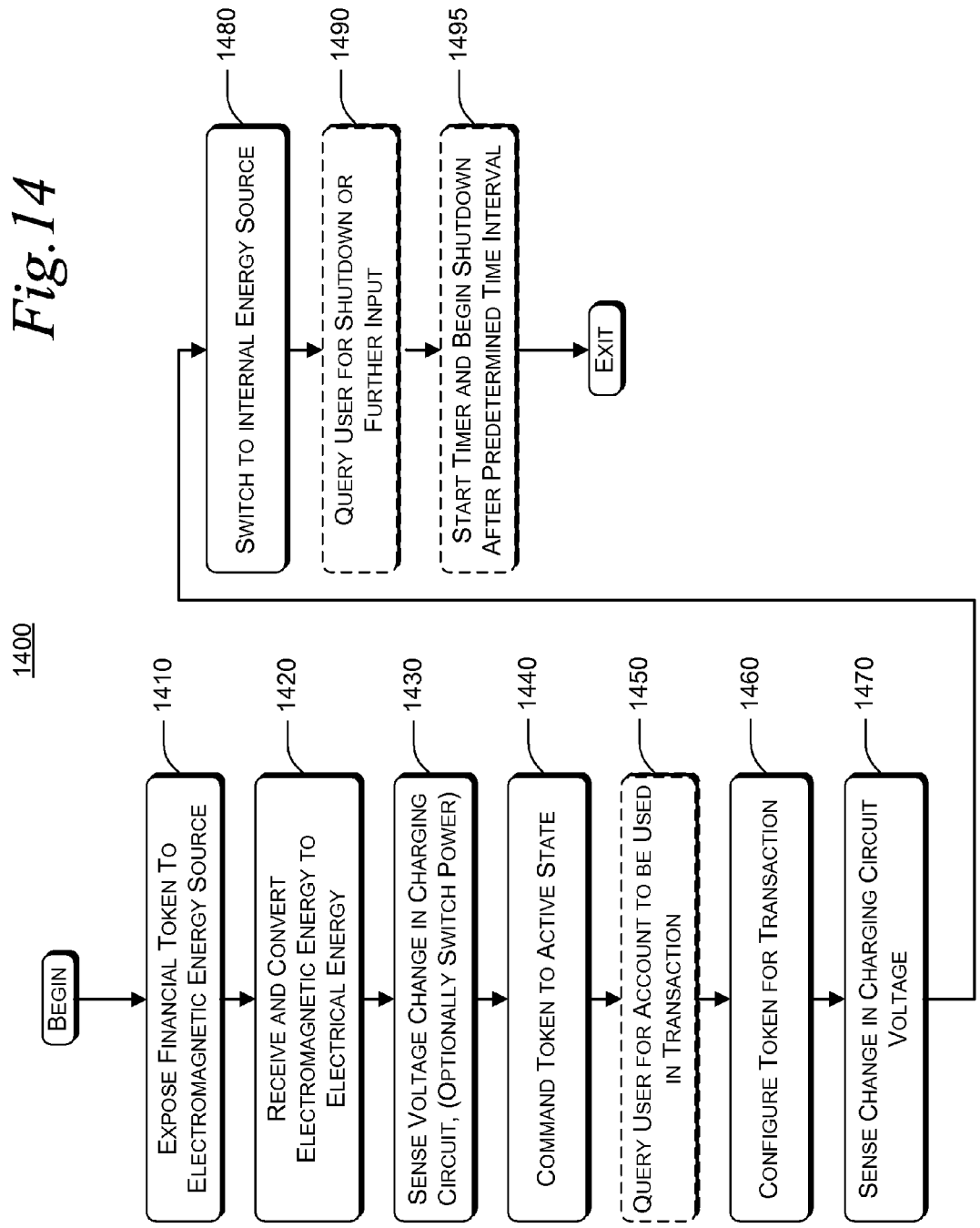
FIG. 14 illustrates another exemplary process for the use of various contemplated implementations a financial transaction token.

FIG. 14 illustrates an exemplary process 1400 for the use of various implementations of a financial transaction token such as financial transaction token 100 seen in FIG. 1 or the financial card 300. In step 1410 the financial transaction token 100 or card 300 is exposed to an electromagnetic energy source such as visible or invisible light, RF energy, ionizing radiation, communication signals from a POS terminal, or an electromagnetic field. Alternatively, the energy receiving means 158 of the financial token 100 or card 300 is separately exposed to such an electromagnetic energy source, which may be the case if the token 100 possesses an external antenna comprising the energy receiving means 158. In step 1420 the electromagnetic energy from the external source is captured by the energy receiving means 158 and delivered to the circuitry of the token 100 or card 300. In one implementation, but not by way of limitation, such energy capturing and conversion may occur by coupling an electromagnetic magnetic field through an inductor, electromagnetic radiation through an antenna, or light through a photovoltaic cell.

In step 1430, the token 100 or card 300 senses a change in voltage and/or current in the output of the energy receiving means 158, and if this change indicates that a sufficient external electromagnetic energy source is available to power the token 100 or card 300 through the energy receiving means 158, a switch may be optionally operated to enable the energy receiving means 158 to provide operating power to the electronic components 145, 105, 130, 150, 154, 155, 151, of the token 100 or card 300. Such operating power may be supplemented by the energy storage device 150, or supplemental energy storage device 151, by operating the switch 152 to select the desired energy source or combination of sources.

Upon sensing 1430 the change in conditions, the token 100 or card 300 becomes active 1440, allowing its electronic circuitry 145, 105, 130, 150, 154, 155, 151, to be operated so as to initiate or complete a financial transaction. For example, in optional step 1450, a user is queried through the user interface 130 to select an account for use in a transaction. If no selection was offered, a default account may be selected in lieu of user input.

Once the account choice is entered or default account data selected, the token 100 or card 300 is configured with the appropriate account-related information to enable the token 100 or card 300 to be used to provide payment for a financial transaction. As non-limiting examples, account information may be provided to and rendered in the data encoding area 145, such as by displaying a bar code representing the account information, transmitting an RF communication signal indicating account information to a POS terminal, transmitting a modulated light beam indicating account information to a POS terminal, displaying an account number, or providing electrical signals for electrical contacts in communication with a POS terminal.

In step 1470, a voltage and/or current change is sensed by the token 100 or card 300 in the charging circuit 162. This change, in one embodiment, indicates an undesirable fluctuation or decline of the charging circuit 162 voltage, or may otherwise comprises sensed conditions that indicate that the external electromagnetic energy source that is providing power to the energy receiving means 158 is no longer sufficient to provide operating power to the electronic components 145, 105, 130, 150, 154, 155, 151, of the card 100 or token 300. Such may be the case if the token 100 or card 300 is being removed from proximity to a POS terminal, or when light provided to a photovoltaic cell of the token 100 or card 300 is being interrupted, or if the token 100 or card 300 is being removed from a wireless charger. In these cases, the switch 152 may be operated to energize 1480 the power circuit 115 with energy provided by, in whole or part, the energy storage device 150 and/or supplemental device 151. In this manner, the token 100 or card 300 may continue to operate when externally provided energy is insufficient or otherwise inhibited.

Step 1490 optionally indicates a step that when the token 100 or card 300 is switched to an internal energy source under a loss of sufficient external electromagnetic energy. In this case the user is prompted through the user interface 130 whether the token 100 or card 300 is to be shut down or otherwise placed into an inactive state. If the user so specifies by entering an indicia through the user interface 130, the processor 105 takes action to bring the processor into an inactive state or energy conserving mode. Optional step 1495 also depicts a condition where the processor 105 of the token 100 or card 300 begins a countdown sequence upon the switching 1480 to the internal source 150 and/or 151. The purpose of this countdown is to turn off the token 100 or card 300 after a predetermined time interval if the internal energy source is enabled and the token 100 or card 300 is not in use, thereby preventing inadvertent discharge of the power source 150 and/or 151. The user may, through the user interface 130, abort the timeout automatic shutdown by entering any indicia that the token 100 or card 300 is to remain in active condition.

The steps of a method, process, or algorithm described in connection with the implementations disclosed herein may be embodied directly in hardware, in a software module executed by a processor, or in a combination of the two. The various steps or acts in a method or process may be performed in the order shown in FIG. 6, or 14 or may be performed in another order. Additionally, one or more process steps may be omitted or one or more process steps may be added to the processes. An additional step, block, or action may be added in the beginning, end, or intervening existing elements of such processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A process for effecting a payment transaction on an account using a financial transaction token, wherein the financial transaction token comprises a power circuit coupled to a capacitor and a contactless electromagnetic energy receiving device, a piezoelectric crystal, an assembly having an exposed region for encoding data regarding the account, a user interface, and a memory storing the data regarding the account, the process comprising:
   generating, by the financial transaction token, current from a moving pendulum mass striking the piezoelectric crystal of the financial transaction token;
   charging, by the financial transaction token, the capacitor with the generated current;
   sensing, by the financial transaction token, electromagnetic radiation from an external source at the contactless electromagnetic energy receiving device in the financial transaction token;

in response to sensing the electromagnetic radiation from the external source:

energizing, by the financial transaction token, the power circuit of the financial transaction token with the electromagnetic radiation;

assuming an active state by the financial transaction token;

energizing, by the financial transaction token, the exposed region for encoding data and the user interface;

obtaining, by the exposed region, the data regarding the account from the memory; and rendering, by the financial transaction token, the data regarding the account in the exposed region;

sensing, by the financial transaction token, a loss of energy of the electromagnetic radiation from the external source; and in response to sensing the loss of energy:

energizing, by the financial transaction token, the power circuit with energy stored in the capacitor.

2. The process of claim 1, further comprising prompting a user to select a particular datum regarding the account to be obtained from the memory for rendering in the exposed region.

3. The process of claim 1, further comprising a step selected from the group consisting of:

receiving, by the power circuit, an induced current by an inductor coupled to the power circuit;

receiving a current produced by a photovoltaic cell coupled to the power circuit; and, receiving a current produced by an antenna coupled to the power circuit.

4. The process of claim 1, further comprising assuming an inactive state by the financial transaction token after a predetermined period of time in response to sensing the loss of energy.

5. The process of claim 1, further comprising, inhibiting the rendering of the data regarding the account in the exposed region in response to sensing the loss of energy.

6. The process of claim 1, wherein the capacitor in the financial transaction token is a multilayer capacitor comprising of more than two planar conductive electrodes.

7. The process of claim 6, wherein the multilayer capacitor comprises an even number of planar conductive electrodes, and alternate layers of the planar conductive electrodes are electrically coupled with each other.

8. The process of claim 1, further comprising:

in response to sensing the loss of energy, initiating a timeout process after which the financial transaction token is to be placed into an inactive state.

9. The process of claim 8, further comprising:

receiving, during the timeout process, user input indicating that the financial transaction token is to remain in an active state; and aborting the timeout process.

10. The process of claim 1, further comprising:

in response to sensing the loss of energy, energizing the power circuit with energy stored in a supplemental energy storage device of the financial transaction token.

11. The process of claim 1, wherein the financial transaction token is a card.

12. The process of claim 1, wherein rendering the data regarding the account in the exposed region includes one of:

displaying a bar code representing an account identifier;

transmitting a communication signal representing the account identifier;

transmitting a modulated light beam representing the account identifier; or displaying the account identifier; or providing electrical signals representing the account identifier for a set of electrical contacts.

13. The process of claim 1, wherein the current generated from the moving pendulum mass striking the piezoelectric crystal consists of current pulses.

14. The process of claim 1, wherein the pendulum mass rotates about a pinned end to strike the piezoelectric crystal.

15. The process of claim 14, wherein the pendulum mass rotates about the pinned end in a planar motion to strike the piezoelectric crystal.

16. The process of claim 14, wherein the piezoelectric crystal is a first piezoelectric crystal, and the financial transaction token includes a second piezoelectric crystal, the process further comprising:

charging the capacitor with current generated from the moving pendulum mass striking the second piezoelectric crystal.

17. The process of claim 1, wherein the exposed region is a magnetic stripe assembly.

18. The process of claim 17, wherein the magnetic stripe assembly is reprogrammable by the financial transaction token.

19. The process of claim 1, wherein the capacitor includes a single dielectric layer or multiple layers of dielectric.

20. The process of claim 6, wherein the multilayer capacitor comprises four or more planar conductive electrodes forming a first set of alternate layers of planar conductive electrodes and a second set of alternate layers of planar conductive electrodes, and the first set of alternate layers of planar conductive electrodes are electrically coupled with each other by one or more vertical vias located at a non-overlapping region of the second set of alternate layers of planar conductive electrodes.

* * * * *